US012283185B2

(12) United States Patent
Cheng

(10) Patent No.: US 12,283,185 B2
(45) Date of Patent: Apr. 22, 2025

(54) ROAD TRAFFIC CONTROL SYSTEM

(71) Applicant: DARWIN PRECISIONS CORPORATION, Hsinchu County (TW)

(72) Inventor: Chih-Ying Cheng, Hsinchu County (TW)

(73) Assignee: DARWIN PRECISIONS CORPORATION, Hsinchu (TW)

( * ) Notice: Subject to any disclaimer, the term of this patent is extended or adjusted under 35 U.S.C. 154(b) by 72 days.

(21) Appl. No.: 18/139,370

(22) Filed: Apr. 26, 2023

(65) Prior Publication Data

US 2024/0233527 A1 Jul. 11, 2024

(30) Foreign Application Priority Data

Jan. 11, 2023 (TW) ................................ 112101134

(51) Int. Cl.
*G08G 1/083* (2006.01)
*G08G 1/01* (2006.01)
*G08G 1/08* (2006.01)

(52) U.S. Cl.
CPC ........... *G08G 1/083* (2013.01); *G08G 1/0112* (2013.01); *G08G 1/0116* (2013.01); *G08G 1/0133* (2013.01); *G08G 1/0145* (2013.01); *G08G 1/08* (2013.01)

(58) Field of Classification Search
CPC ............................ G08G 1/083; G08G 1/0112
See application file for complete search history.

(56) References Cited

U.S. PATENT DOCUMENTS

| | | | | |
|---|---|---|---|---|
| 8,855,900 | B2 * | 10/2014 | Lection | G08G 1/0145 340/928 |
| 9,711,045 | B1 * | 7/2017 | Worthy | G08G 1/087 |
| 10,127,811 | B2 * | 11/2018 | Xu | G08G 1/082 |
| 11,037,441 | B2 | 6/2021 | Jiang et al. | |
| 11,055,991 | B1 * | 7/2021 | Mulligan | G08G 1/091 |
| 11,302,186 | B2 * | 4/2022 | Shi | G06V 20/584 |

FOREIGN PATENT DOCUMENTS

| | | | |
|---|---|---|---|
| CN | 105869422 | A | 8/2016 |
| CN | 111415520 | A | 7/2020 |
| TW | 200903396 | A | 1/2009 |
| TW | 201142765 | A1 | 12/2011 |
| TW | 202004703 | A | 1/2020 |
| TW | M598490 | U | 7/2020 |
| TW | 202217767 | A | 5/2022 |

* cited by examiner

*Primary Examiner* — John A Tweel, Jr.

(57) ABSTRACT

A road traffic control system includes a mobile terminal, a fixed terminal, a traffic sign, a control module, and a prompt unit. The mobile terminal includes a mobile terminal communication module for transmitting mobile terminal parameter data. The fixed terminal includes a fixed terminal communication module that is in communication connection with the mobile terminal communication module and is configured to receive the mobile terminal parameter data. The traffic sign includes a sign communication module configured to be in communication connection with the fixed terminal communication module. The control module is connected to the sign communication module. The prompt unit is connected to the control module and configured to provide a traffic instruction according to the mobile terminal parameter data.

2 Claims, 2 Drawing Sheets

ROAD TRAFFIC CONTROL SYSTEM

FIELD OF THE INVENTION

The present invention relates to a road traffic control system, and more particularly to a road traffic control system for alleviating traffic congestion by controlling waiting time set by a traffic sign.

BACKGROUND OF THE INVENTION

In road traffic, different intersections (roads) have different traffic flows at different periods of time. In the rush hour of traffic, because the traffic flow is larger, traffic congestion occurs easily due to too long waiting time set by traffic signs.

At present, the way to deal with traffic congestion is usually to invite relevant personnel (such as traffic policemen, traffic volunteers, or engineers) to the scene, to manually control waiting time of traffic signs, or to guide the traffic flow by directing the traffic to alleviate the traffic congestion.

However, such way will face many problems in addition to the problems of time consumption and manual operation. For example, relevant personnel may not be able to go to the site for relevant setting of traffic signs due to weather factors; relevant personnel cannot master set parameters of traffic signs, and need to contact a traffic center to obtain relevant set parameters; to avoid accidents, relevant personnel may not be able to conduct traffic command/setting adjustment when the traffic flow is too large; and to save manpower, relevant personnel usually perform relevant setting of traffic signs at a specific time only, which has the problems of lack of flexibility, timeliness, and convenience.

SUMMARY OF THE INVENTION

In view of this, the present invention provides a road traffic control system. The road traffic control system in the present invention may obtain mobile terminal parameter data of a mobile terminal by using a fixed terminal in a transportation system, and automatically change/provide a traffic instruction of a traffic sign in real time according to the mobile terminal parameter data to control the traffic flow of a road, so as to effectively control the problem of traffic congestion, reduce unnecessary manual operation, and avoid the risk of traffic accidents of relevant personnel directing the traffic on site.

A road traffic control system provided by the present invention includes: a mobile terminal, including a mobile terminal communication module for transmitting mobile terminal parameter data; a fixed terminal, including a fixed terminal communication module that is in communication connection with the mobile terminal communication module and is configured to receive the mobile terminal parameter data; a traffic sign, including a sign communication module configured to be in communication connection with the fixed terminal communication module; a control module connected to the sign communication module; and a prompt unit connected to the control module and configured to provide a traffic instruction according to the mobile terminal parameter data.

In an embodiment of the present invention, in the above road traffic control system, the fixed terminal communication module is connected to the sign communication module through a controller area network communication interface.

In an embodiment of the present invention, the above road traffic control system further includes a cloud database connected to the fixed terminal communication module and configured to provide traffic parameter data.

In an embodiment of the present invention, in the above road traffic control system, the fixed terminal further includes a processing unit connected to the fixed terminal communication module and configured to provide sign control data according to the mobile terminal parameter data and the traffic parameter data.

In an embodiment of the present invention, in the above road traffic control system, the mobile terminal communication module transmits the traffic parameter data to the fixed terminal communication module through a wireless wide area network.

In an embodiment of the present invention, in the above road traffic control system, the fixed terminal communication module further includes: a first communication interface for transmitting the sign control data to the traffic sign through the controller area network communication interface; and a second communication interface for receiving the mobile terminal parameter data from the mobile terminal through the wireless wide area network.

In an embodiment of the present invention, in the above road traffic control system, a plurality of fixed terminals are in communication connection with a plurality of traffic signs through the controller area network communication interface, and the plurality of fixed terminals share the mobile terminal parameter data.

In conclusion, in the road traffic control system of the present invention, the mobile terminal may transmit the mobile terminal parameter data to the fixed terminal, the traffic sign may be in communication connection with the fixed terminal communication module through the sign communication module, and the control module may control the prompt unit to provide the traffic instruction according to the mobile terminal parameter data. Through the above architecture, the road traffic control system in the present invention may automatically change/provide the traffic instruction of the traffic sign in real time according to the mobile terminal parameter data to adjust the traffic flow of the road, so as to effectively control the problem of traffic congestion, reduce unnecessary manual operation, and avoid the risk of traffic accidents of relevant personnel directing the traffic on site.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
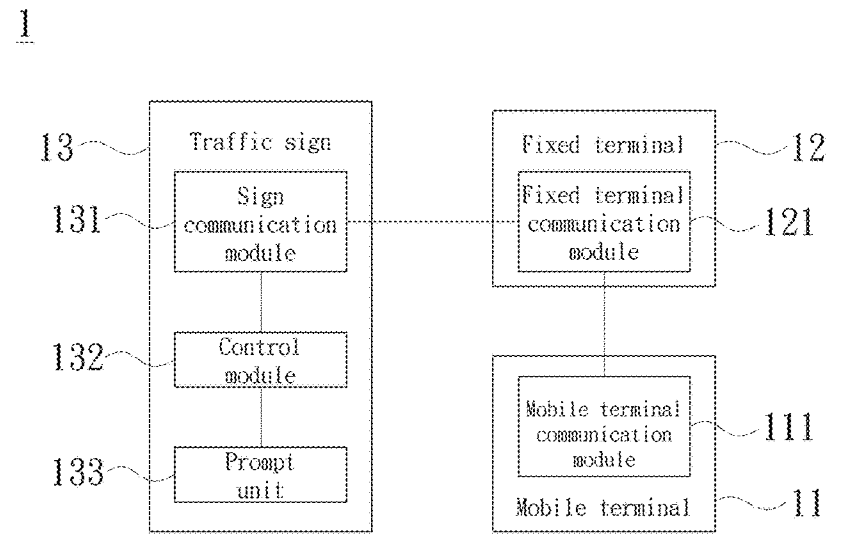
FIG. 1 is a block diagram of a road traffic control system provided by an embodiment of the present invention.

A reference is made to FIG. 1. FIG. 1 is a block diagram of a road traffic control system provided by an embodiment of the present invention.

In this embodiment, the road traffic control system 1 of the present invention includes a mobile terminal 11, a fixed terminal 12, and a traffic sign 13. The mobile terminal 11 includes a mobile terminal communication module 111; the fixed terminal 12 includes a fixed terminal communication module 121; and the traffic sign 13 includes a sign communication module 131, a control module 132, and a prompt unit 133. The fixed terminal communication module 121 is in communication connection with the mobile terminal communication module 111 and the sign communication module 131, and the control module 132 is connected to the sign communication module 131 and the prompt unit 133.

In this embodiment, in the road traffic control system 1 of the present invention, the mobile terminal 11 may transmit mobile terminal parameter data through the mobile terminal communication module 111, the fixed terminal 12 may be in communication connection with the mobile terminal communication module 111 through the fixed terminal communication module 121 and receives the mobile terminal parameter data, the traffic sign 13 may be in communication connection with the fixed terminal communication module 121 through the sign communication module 131, and the control module 132 connected to the sign communication module 131 controls the prompt unit 133 connected to the control module 132 to provide a traffic instruction according to the mobile terminal parameter data. For example, the mobile terminal 11 and the fixed terminal 12 may be a mobile vehicle and a fixed stop in a transportation system, respectively. More specifically, the mobile terminal 11 may be a bus, and the fixed terminal 12 may be, for example, a bus stop. The mobile terminal parameter data may be, for example, a position, a speed, arrival time and other traffic information of the mobile terminal 11. The mobile terminal 11 may be a mobile vehicle traveling according to a fixed schedule and a fixed route. The mobile terminal 11 may obtain the mobile terminal parameter data from a plurality of mobile terminals 11, and then transmit the mobile terminal parameter data to the control module 132 of the traffic sign 13 through the sign communication module 131, so that the control module 132 may control the prompt unit 133 to provide the traffic instruction according to the mobile terminal parameter data. The control module 132 may be, for example, a single-chip microcontroller unit (MCU), a central processing unit (CPU) or other device that may control the prompt unit 133 to provide the traffic instruction according to the mobile terminal parameter data. The prompt unit 133 may be, for example, a traffic light, a warning light, or a device for giving a voice prompt. As mentioned above, in this embodiment, the mobile terminal 11 may provide the mobile terminal parameter data such as the position, the speed, and the arrival time of the mobile terminal 11, and transmit the mobile terminal parameter data to the traffic sign 13 through the fixed terminal 12 to control a light signal of the traffic sign 13, or to give the voice prompt. For example, a current traffic flow status may be determined by the traffic information such as the position, the speed, and the arrival time of the bus, a traffic instruction suitable for the current traffic flow status is provided to adjust the traffic flow status of a road, and the traffic flow is adjusted by automatically changing/providing the traffic instruction of the traffic sign in real time to avoid traffic congestion. In one embodiment, the road traffic control system 1 includes a plurality of mobile terminals 11 and a plurality of fixed terminals 12, to more accurately determine traffic flow statuses of roads.

Figure 2:
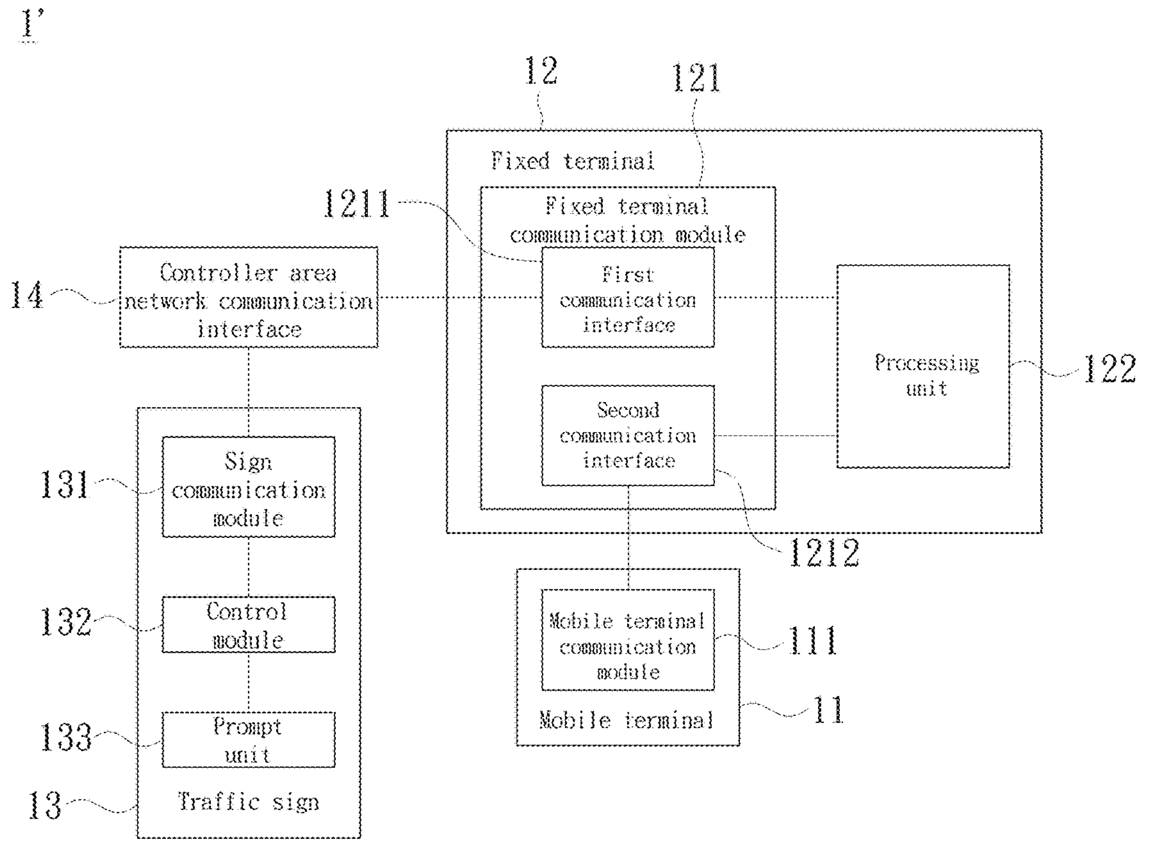
FIG. 2 is a block diagram of a road traffic control system provided by another embodiment of the present invention.

Then, a reference is made to FIG. 2. FIG. 2 is a block diagram of a road traffic control system 1' provided by another embodiment of the present invention.

The present invention provides a plurality of embodiments. In the embodiments of the present invention, the components/devices using the same symbol represent that the functions of the components/devices may also include the same functions as other embodiments and therefore will not be repeated in the embodiments of the present invention, and only the differences from other embodiments are illustrated. The items mentioned in the embodiments may be rearranged and combined as long as there is no conflict, and applied to the embodiments. The present invention is not limited to the listed embodiments.

In this embodiment, the road traffic control system 1' of the present invention further includes a controller area network (CAN or CAN bus) communication interface 14; the fixed terminal communication module 121 of the fixed terminal 12 further includes a first communication interface 1211 and a second communication interface 1212; and the fixed terminal 12 further includes a processing unit 122. The second communication interface 1212 is connected to the mobile terminal communication module 111 and the processing unit 122; the first communication interface 1211 is connected to the processing unit 122 and the controller area network communication interface 14; and the controller area network communication interface 14 is connected to the sign communication module 131.

In this embodiment, the mobile terminal communication module 111 of the mobile terminal 11 may transmit the mobile terminal parameter data to the fixed terminal communication module 121 through a wireless wide area network (WWAN), the fixed terminal communication module 121 includes the first communication interface 1211 and the second communication interface 1212, the first communication interface 1211 is configured to transmit sign control data to the traffic sign 13 through the controller area network communication interface 14, and the second communication interface 1212 is configured to receive the mobile terminal parameter data from the mobile terminal 11 through the wireless wide area network. For example, the mobile terminal communication module 111 of the mobile terminal 11 may include a positioning function. For example, positioning information of the mobile terminal 11 may be obtained through a global positioning system (GPS), and then the positioning information of the mobile terminal 11 is transmitted to the processing unit 122 through the wireless wide area network. The processing unit 122 may convert the mobile terminal parameter data into the sign control data. For example, the processing unit 122 may compare positioning information of a plurality of mobile terminals 11 to determine the current traffic flow status, and calculate the sign control data. Then the first communication interface 1211 of the fixed terminal communication module 121 is in communication connection with the sign communication module 131 through the controller area network communication interface 14, and the sign control data is transmitted to the traffic sign 13, so that the control module 132 may control the prompt unit 133 to provide the traffic instruction according to the signal control data so as to adjust the traffic flow status. The sign control data may include, for example, a time parameter. For example, the time parameter may be time (display time of a green light and a red light) for indication of vehicle passing and stopping. The processing unit 122 is a device with a computing function, for example, it may be a single-chip microcontroller unit (MCU) or a central processing unit (CPU), so that the processing unit 122 may calculate the sign control data according to the mobile terminal parameter data. In this embodiment, the fixed terminal 12 is in communication connection with the traffic sign 13 through the controller area network communication interface 14, so as to achieve the technical effects of simple connection, high extensibility, low integration cost, etc.

Figure 3:
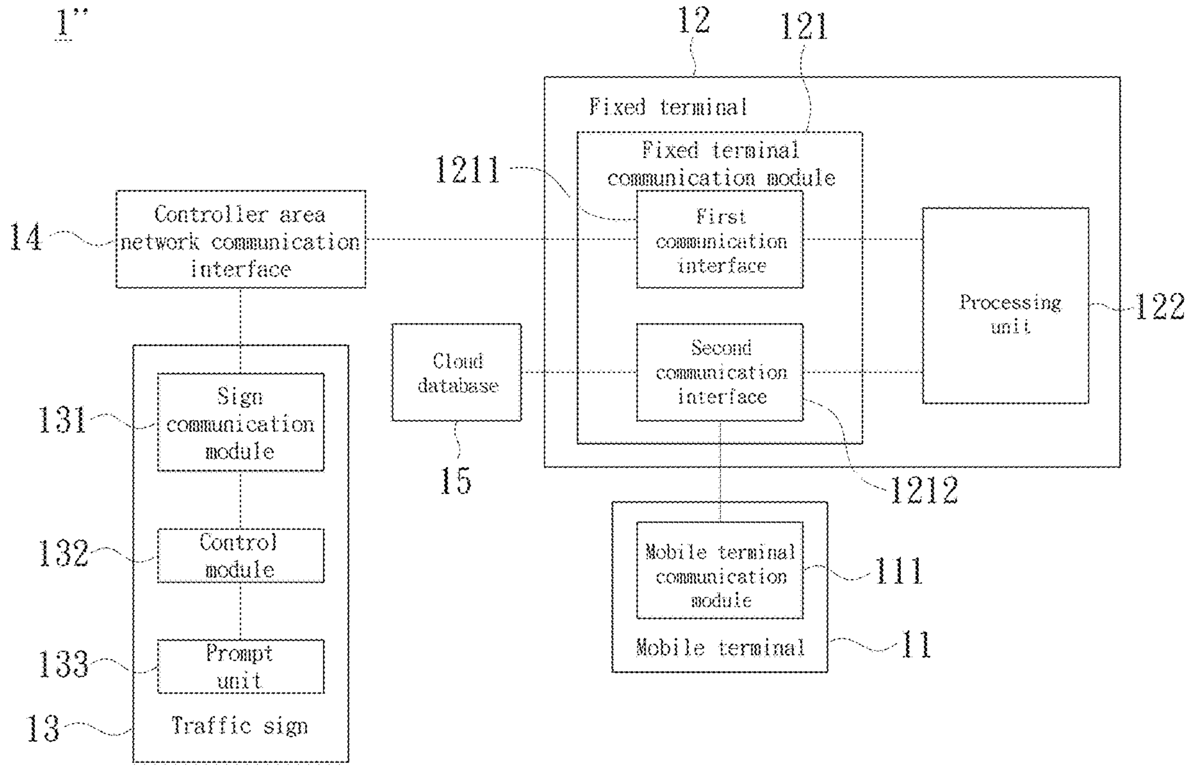
FIG. 3 is a block diagram of a road traffic control system provided by another embodiment of the present invention.

Next, a reference is made to FIG. 3. FIG. 3 is a block diagram of a road traffic control system 1" provided by another embodiment of the present invention.

In this embodiment, the road traffic control system 1" of the present invention further includes a cloud database 15, where the cloud database 15 is connected to the second communication interface 1212 and configured to provide traffic parameter data. The traffic parameter data may be, for example, mobile terminal parameter data uploaded by the plurality of mobile terminals 11 through the mobile terminal communication module 111, or traffic flow data provided by a road management organization. The traffic flow data may be traffic flow data of corresponding time periods and roads, or real-time traffic flow data. In one embodiment, the second communication interface 1212 may also be a wired network communication interface. The processing unit 122 may calculate and provide the sign control data according to the mobile terminal parameter data and the traffic parameter data, to adjust the traffic flow status.

Figure 4:
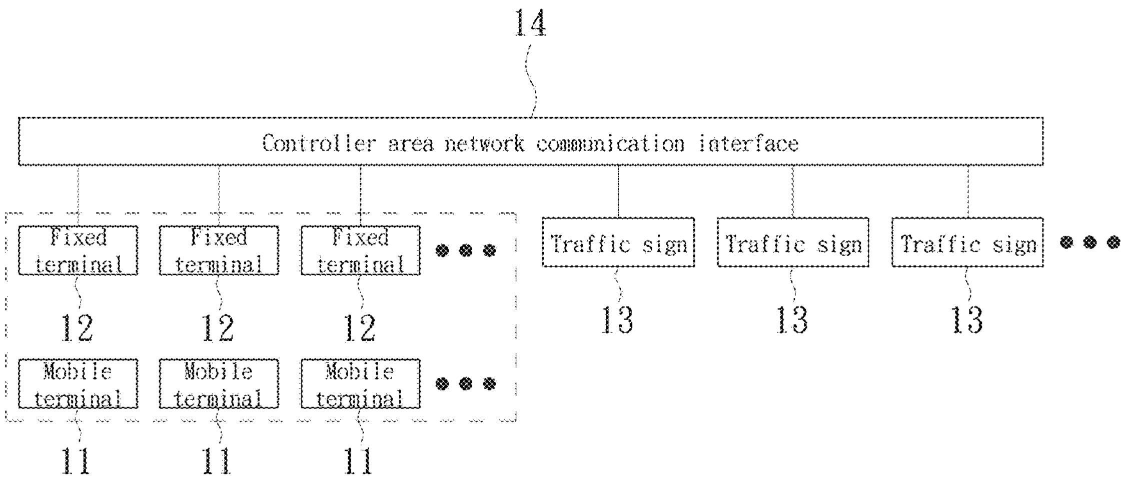
FIG. 4 is a schematic diagram of a connection relationship provided by an embodiment of the present invention.

Then, a reference is made to FIG. 4. FIG. 4 is a schematic diagram of a connection relationship provided by an embodiment of the present invention.

The connection relationship shown in this embodiment is applicable to the road traffic control system of the above embodiments. In this embodiment, the road traffic control system may include a plurality of mobile terminals 11, a plurality of fixed terminals 12, and a plurality of traffic signs 13. The plurality of fixed terminals 12 may be in communication connection with the plurality of traffic signs 13 through the controller area network communication interface 14, and the plurality of fixed terminals 12 may share the plurality of pieces of mobile terminal parameter data from the plurality of mobile terminals 11. For example, the mobile terminals 11 may transmit the mobile terminal parameter data to any one or more fixed terminals 12 in the plurality of fixed terminals 12 through the wireless wide area network, and then transmit the mobile terminal parameter data to the fixed terminals 12 through the controller area network communication interface 14, so as to share the plurality of pieces of mobile terminal parameter data from the plurality of mobile terminals 11.

For example, the road traffic control system of the present invention may be applied to a bus system. At this time, the mobile terminal 11 may be a bus, and the fixed terminal 12 may be a smart stop. The fixed terminal 12 may receive the mobile terminal parameter data of the mobile terminal 11, and then confirm the number of vehicles on the road through a time difference of signal sending (that is, a time difference of arrival) by the bus, and each smart stop may transmit the relevant information and instruction (such as the mobile terminal parameter data, the traffic instruction, the traffic parameter data, and the sign control data) to other smart stop through the controller area network communication interface 14.

When the smart stop confirms that the arrival time of the bus is longer according to the mobile terminal parameter data, it represents that the number of vehicles on the traffic road increases. The road traffic control system of the present invention may transmit notification messages to the smart stops through the controller area network communication interface 14, respectively, then the nearest stop transmits light signal change time of the traffic sign through the controller area network communication interface 14, and in the controller area network communication interface 14, the smart stops and the traffic signs may be connected in series (that is, data of the smart stops and the traffic signs may be shared), so that when the bus is delayed to arrive at the stop, the smart stop nearest to an intersection with traffic jam may be notified through comparative calculation of the smart stops. The present invention may control the traffic instruction of the traffic sign through a communication link of the controller area network communication interface 14. Therefore, when it is found that the traffic flows in the first few road segments of a road increase, the time (that is, the traffic signs are connected in series) of the traffic instructions of the traffic signs at the whole intersection may be adjusted in real time, so that the traffic flows of the road segments become smooth, thereby eliminating the trouble of traffic jam of people, and further reducing the workload of policemen and traffic volunteers; and meanwhile, people waiting for a mass transit system may know current statuses of buses through smart stops, to shorten the waiting time of people and facilitate passengers to take the buses.

In conclusion, in the road traffic control system of the present invention, the mobile terminal may transmit the mobile terminal parameter data to the fixed terminal, the traffic sign may be in communication connection with the fixed terminal communication module through the sign communication module, and the control module may provide the traffic instruction according to the mobile terminal parameter data. Through the above architecture, the road traffic control system in the present invention may automatically change/provide the traffic instruction of the traffic sign in real time according to the mobile terminal parameter data to adjust the traffic flow of the road, so as to effectively control the problem of traffic congestion, reduce unnecessary manual operation, and avoid the risk of traffic accidents of relevant personnel directing the traffic on site.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A road traffic control system, comprising:

a mobile terminal, comprising
  a mobile terminal communication module, for transmitting mobile terminal parameter data;

a fixed terminal, comprising
  a fixed terminal communication module, in communication connection with the mobile terminal communication module and configured to receive the mobile terminal parameter data; and a traffic sign, comprising
  a sign communication module, configured to be in communication connection with the fixed terminal communication module;
  a control module, connected to the sign communication module; and
  a prompt unit, connected to the control module and configured to provide a traffic instruction according to the mobile terminal parameter data;

wherein the fixed terminal communication module is connected to the sign communication module through a controller area network communication interface;

wherein the road traffic control system further comprises:

a cloud database, connected to the fixed terminal communication module and configured to provide traffic parameter data;

wherein the fixed terminal further comprises:

a processing unit, connected to the fixed terminal communication module and configured to provide sign control data according to the mobile terminal parameter data and the traffic parameter data;

wherein the mobile terminal communication module transmits the mobile terminal parameter data to the fixed terminal communication module through a wireless wide area network;

wherein the fixed terminal communication module further comprises:

a first communication interface, for transmitting the sign control data to the traffic sign through the controller area network communication interface; and a second communication interface, for receiving the mobile terminal parameter data from the mobile terminal through the wireless wide area network.

2. The road traffic control system according to claim 1, wherein a plurality of fixed terminals are in communication connection with a plurality of traffic signs through the controller area network communication interface, and the plurality of fixed terminals share the mobile terminal parameter data.

* * * * *